July 3, 1951 G. A. HANSMAN 2,558,720
FASTENER
Filed July 19, 1946

INVENTOR.
GEORGE A. HANSMAN
BY
ATTORNEY

UNITED STATES PATENT OFFICE 2,558,720

FASTENER

George A. Hansman, Cleveland, Ohio, assignor to Tinnerman Products, Inc., Cleveland, Ohio, a corporation of Ohio Application July 19, 1946, Serial No. 684,757

1 Claim. (Cl. 85—36)

This invention relates to an improved sheet metal fastener and more particularly to a single piece stamping which may be readily applied to a sheet metal part for receiving a threaded screw where the sheet metal panel or part is of insufficient thickness to form suitable threads therein.

In a blind location wherein it is impossible or inconvenient for an operator to hold a nut while inserting a securing bolt or screw, it is desirable to apply the fastener to the sheet metal panel over a preformed aperture and apply the bolt through aligned apertures in the panels to be secured together, and threading the bolt into the fastener.

An object of the present invention is to stamp a fastener from a single piece of sheet metal preferably of spring steel, having an aperture for receiving of bolt and portions disposed out of the plane of the main body portion for frictionally engaging opposite side of a sheet metal panel to which the fastener is applied.

Another object of the invention is to provide resilient fingers on the fastener which are in a plane normally at an angle to the plane of the main body portion and to provide a depressed lip around the aperture in the fastener which together with the resilient fingers retains the fastener in position on the sheet metal panel during assembly before the bolt is applied.

A further object of the invention is to form the fastener from a single stamping which is reliable and effective in use, easily and quickly installed, and which is simple and light-weight in construction to be most inexpensive in cost of manufacture, shipping and handling.

Other objects and advantages of the invention will more fully appear from the following description taken in connection with the accompanying drawings, in which.

Figure 1:
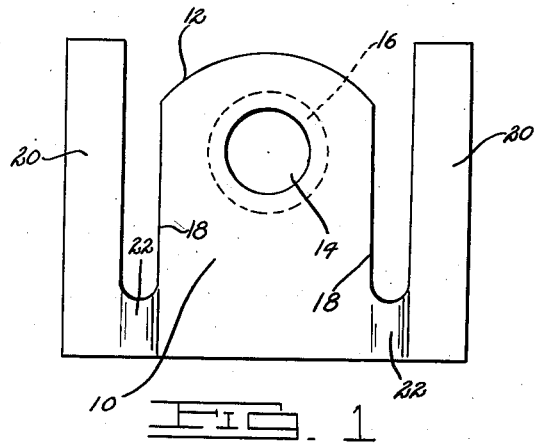
Fig. 1 is a top plan view of the improved fastener.
Figure 2:
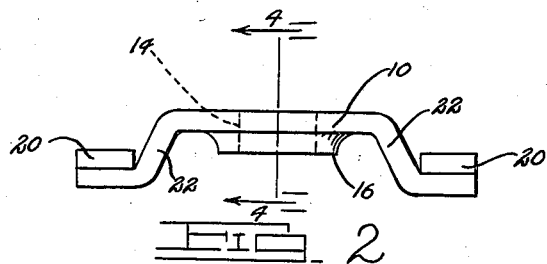
Fig. 2 is an end view of Fig. 1.

Referring to the drawings, a sheet metal stamping has a main body portion 10 which is substantially rectangular in form, except for a curved end portion 12, and lies substantially in a flat plane. An aperture 14 is formed in the body portion 10 and a downwardly depressed lip 16 is formed to define the aperture 14.

At the opposite side edges 18 of the main body portion 10 are fingers 20 which are integrally connected to the side edge portions 18 at one end of the main body portion 10 by downwardly extending connectors 22. The fingers 20 are pressed out of the plane of the main body portion 10 a distance substantially equal to the thickness of the part to which the fastener is to be applied.

Figure 3:
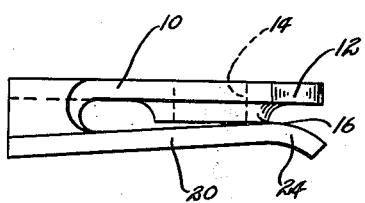
Fig. 3 is a side elevational view of the form shown in Figs. 1 and 2.

As viewed in Fig. 3, it will be noted that the fingers 20 diverge from the connectors 22 upwardly toward the plane of the main body portion 10 and as illustrated at 24 the free ends are bent downwardly to provide a rounded edge for facilitating application of the fastener over the edge of a panel.

Figure 4:
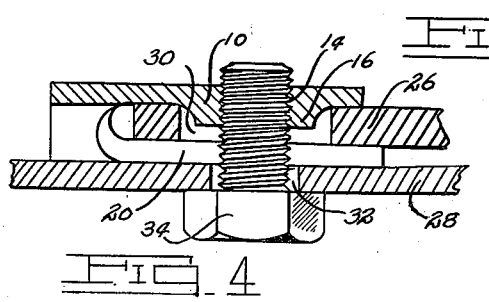
Fig. 4 is a sectional view along line 4—4 in Fig. 2 showing the fastener in its applied form for securing two panels together.

Reference is now made to Fig. 4, wherein the fastener has been applied to the edge of a panel 26 which is to be attached to a panel 28. The fastener is first slipped over the edge of the panel 26 by placing the fingers 20 on the under surface of the panel and then forcing the main body portion 10 upwardly against the tension of the resilient fingers 20. The main body portion 10 is then slid over the upper surface of the panel 26 until the lip 16 snaps into an aperture 30 in the panel 26. The fastener is then held in position for assembly with the panel 28. The fingers 20 extend slightly beyond the outer end of the main body portion 10 to permit easy application of the fastener on the panel.

The panel 28 has an aperture 32 which receives a bolt or screw 34. The panels 26 and 28 are positioned with the apertures in axial alignment and the bolt 34 is threaded into the aperture 14 of the fastener. When the panels are drawn together, as by tightening the bolt, the fingers are flattened out between the two panels and the parts are securely held in assembled position.

A fastener which is made in accordance with the present invention has a decided commercial advantage in that it may be stamped from sheet metal and completely formed in a single stamping operation with a minimum amount of metal waste.

It will be understood that various changes including the size, shape and arrangement of parts may be made without departing from the spirit of my invention and it is not my intention to limit its scope other than by the terms of the appended claim.

I claim:

A fastener adapted to clasp an apertured edge portion of a panel in locked self-sustained position on said panel, said fastener comprising a piece of sheet metal provided with a pair of open-ended slots extending from one end of said fastener to adjacent the other end of said fastener, said slots providing an intermediate body portion, a pair of side fingers having free ends on opposite sides of said intermediate body portion and spaced laterally therefrom, and a transverse portion extending entirely across the fastener and integrally connecting said body portion and fingers, said transverse portion intermediately lying in the plane of said intermediate body portion and extremely lying in the plane of said side fingers, said transverse portion in the regions at the ends of said slots being bent to extend from the same side of said intermediate body portion to provide a horizontal space between said intermediate body portion and said side fingers for receiving said panel between said body portion and side fingers in clasping relation with opposite faces of said panel in the attached position of the fastener, said fingers having portions adjacent their free ends of less horizontal spacing from said intermediate body portion than at their junctions with said intermediate body portion, said intermediate body portion having a thread opening and the marginal edge of said opening being bent inwardly out of the plane thereof to define an inwardly projecting lip having its free end in the space between said intermediate body portion and said side fingers, said free end of said projecting lip being receivable in the aperture in said panel in said attached position of the fastener to hold the fastener in said attached position in cooperation with said body portion and side fingers in clasping relation with opposite faces of said panel.

GEORGE A. HANSMAN.

REFERENCES CITED

The following references are of record in the file of this patent:

UNITED STATES PATENTS

| Number | Name | Date |
|---|---|---|
| 384,034 | Hack | June 5, 1888 |
| 1,778,428 | Morehouse | Oct. 14, 1930 |
| 2,115,312 | Lombard | Apr. 25, 1938 |
| 2,176,846 | Werme | Oct. 17, 1939 |
| 2,230,355 | Kost | Feb. 4, 1941 |
| 2,233,230 | Tinnerman | Feb. 25, 1941 |
| 2,252,904 | Todd | Aug. 19, 1941 |
| 2,376,167 | Mitchell | May 15, 1945 |
| 2,382,942 | Murphy | Aug. 14, 1945 |